W. W. DRYDEN.
PRESCRIPTION BALANCE OR SCALE.
APPLICATION FILED JUNE 19, 1908.
923,781.
Patented June 1, 1909.
3 SHEETS—SHEET 3.
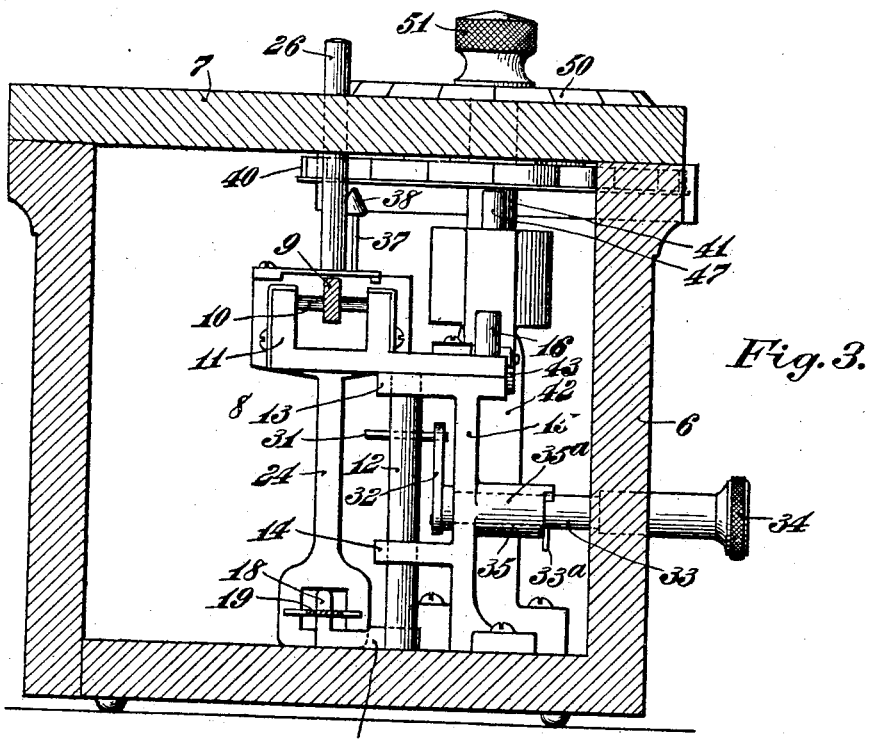
Fig. 3.
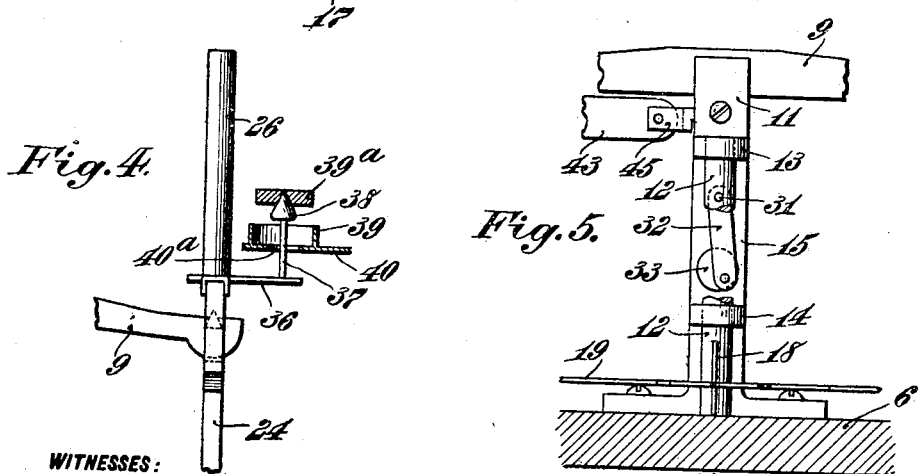
Fig. 4.
Fig. 5.
WITNESSES:
Thomas M. Smith
D. M. Connerton
INVENTOR
William W. Dryden,
BY J. Walter Douglas
ATTORNEY.

UNITED STATES PATENT OFFICE.

WILLIAM W. DRYDEN, OF PHILADELPHIA, PENNSYLVANIA.

PRESCRIPTION BALANCE OR SCALE.

No. 923,781.   Specification of Letters Patent.   Patented June 1, 1909.

Application filed June 19, 1908. Serial No. 439,297.

*To all whom it may concern:*

Be it known that I, WILLIAM W. DRYDEN, a citizen of the United States, residing at the city of Philadelphia, in the county of Philadelphia and State of Pennsylvania, have invented certain new and useful Improvements in Prescription Balances or Scales, of which the following is a specification.

My invention has relation to a prescription balance or scale for pharmacists as well as others protected against extraneous matter and arranged so as to be adapted with absolute accuracy to positively weigh material or substances without handling the different weights employed to denote different quantitative amounts; and in such connection my invention relates to the constructive arrangement of the weighing appliance and manner of manipulating to bring the scale from a poised inoperative position into an overbalanced or weighted operative position, in which quantitative matter placed thereon can be accurately or reliably weighed.

The nature and scope of my present invention will be more fully understood from the following description taken in connection with the accompanying drawings forming part hereof, in which—

Figure 1:
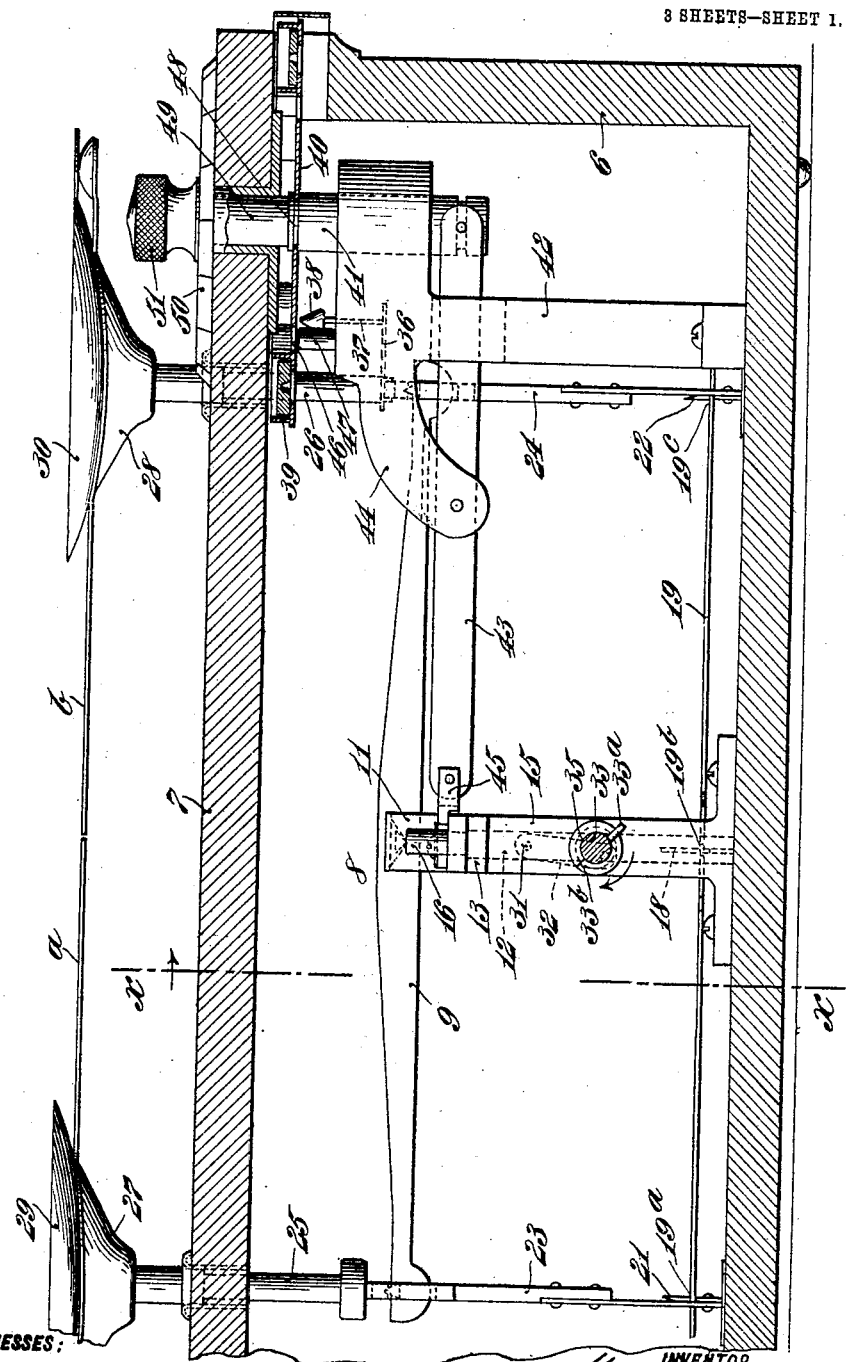
Figure 2:
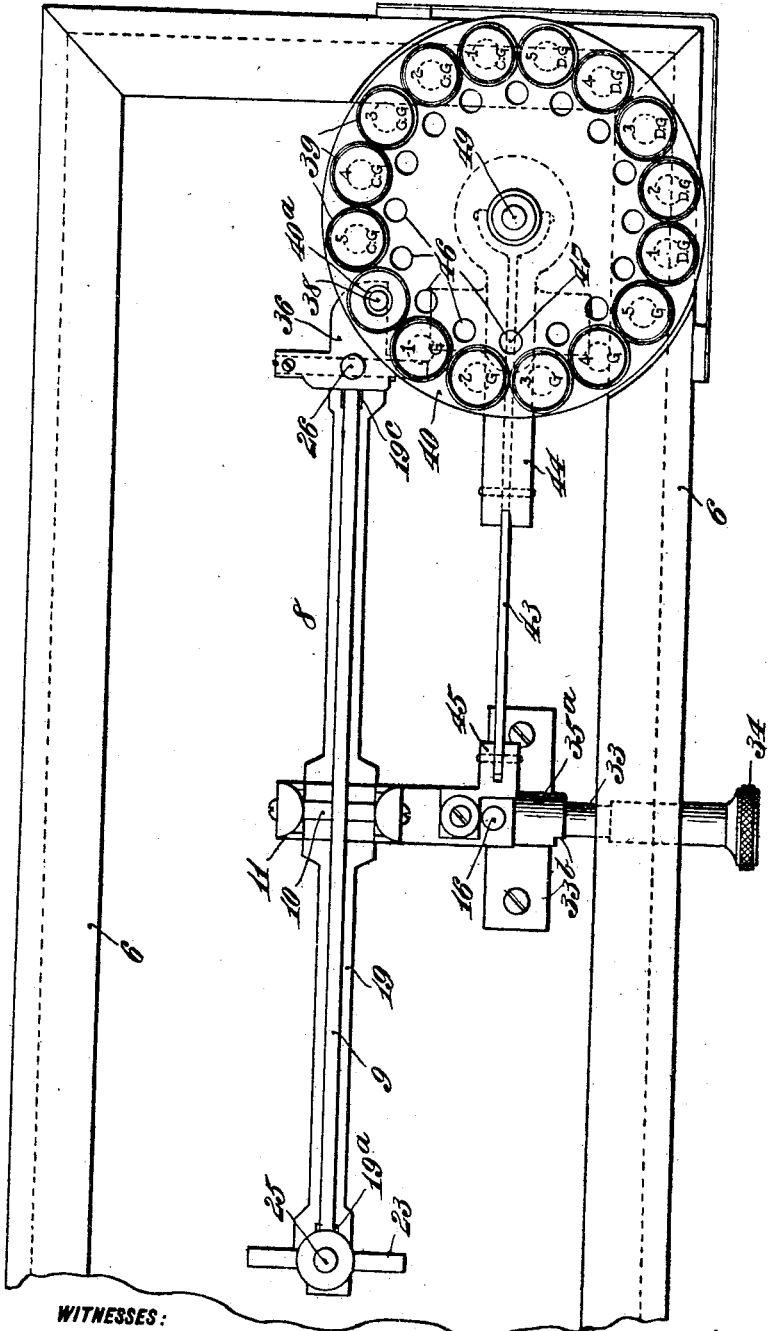

Figure 1, is a vertical longitudinal sectional view through a casing showing partly in elevation, a prescription balance or scale, embodying the main features of my invention and showing also means for elevating the scale-beam to cause a pin to engage a weight of a series of a rotatable internal pocket-wheel and having on the exterior a graduated dial-plate, the arrangement being such that when the scale-beam has been elevated from a poised inoperative position to an overbalancing one by weighting one end of the scale the other end of the scale-beam is adapted to receive a quantitative amount of matter to bring such end into a position to equalize the weighted end of the scale-beam. Fig. 2, is a top or plan view with the cover or lid of the scale or balance removed, showing the scale-beam, the crank-means with an operating thumb-nut for elevating the scale-beam, and the weight carrying pocket-wheel rotated by a thumb-nut for bringing the desired denomination of weight of a pocket of said wheel into a position to be engaged by a pin actuated by the scale-beam. Fig. 3, is a vertical sectional view on the line $x$, $x$, of Fig. 1. Fig. 4, is a detail view, partly in elevation and partly in section, of the weight raising and lowering pin actuated by the scale-beam, shown removed from stand or casing; and Fig. 5, is a detail view in broken elevation of the crank-means for elevating and lowering the scale-beam.

Referring to the drawings 6, is an oblong casing or stand for housing the main working parts of the scale or balance and provided with a removable cover or lid 7.

8, is the scale or balance, consisting of the beam 9, centrally supported by a narrow metal strip 10, in notches of a U-shaped bracket 11, which is carried by a rod 12, movably supported in bearings 13 and 14, of a standard 15, and held in an alined transverse position by means of a vertical pin 16, passing through the bracket 11, as clearly illustrated in Figs. 1 and 3. The rod 12, carries at the bottom a narrow cross-strip 17, with a pin 18, for engaging a longitudinal bar 19, the middle as well as ends being perforated at $19^a$, $19^b$ and $19^c$, and the ends respectively, engage pins 21 and 22, of end uprights 23 and 24, to which the longitudinal scale-beam 9, at the top is delicately adjusted. Vertical extensions of the end uprights are formed into rods 25 and 26, for the reception and locking of the dish-shaped plates 27 and 28, provided with pointers $a$ and $b$, extending toward each other, as illustrated in Fig. 1. Onto the plates 27 and 28, are adapted to be placed matter receiving dishes 29 and 30. The rod 12, has projecting through the upper part of the same a transverse pin 31. This pin is connected with a link 32, which is eccentrically pinned to a rotatable transversely arranged bar 33, which is provided at the free end, beyond the casing, with a thumb-nut 34. The bar 33, is held in a bearing $35^a$, in an extension 35, of the standard 15, as clearly shown in Figs. 3 and 5. On an extension 36, of the end upright 24, of the scale or balance is provided a pin 37, with preferably a cone-shaped head 38, for engaging one of a series of weights of different denominations mounted in a pocket 39, of the series of a rotatable wheel 40, provided with a plunger 41. The plunger 41, of the wheel 40, is afforded movement in a standard 42, by means of a rocking-beam 43, fulcrumed to the projecting-arm 44, of the standard 42. The rocking-beam 43, is movably connected at one end with the plunger 41, and at the other end in bearings 45, of the bracket 11, connected with the standard 15.

The weight carrying pocket wheel 40, is provided adjacent to the pockets 39, with perforations 46, arranged around the wheel 40, between the pockets thereof, for engaging a lock-pin 47, secured to and extending vertically from the projecting-arm 44. The wheel 40, is provided with a central opening 48, with which is suitably engaged for detaching as required the stem 49, of a graduated dial-plate 50, corresponding with the respective weights of the wheel 40, provided with a thumb operating nut 51. The rotatable wheel 40, and dial-plate 50, are operated in unison, by means of the nut 51, in the lowered position of the scale-beam 9, and while the cone-shaped head 38, of the pin 37, is freed from its engagement with a weight of the series of the pocket-wheel 40. When the beam 9, has been raised by means operated by the thumb-nut 34, the pins 37 and 47, engage respectively, a weight $39^a$ and opening 46, of the series of the wheel 40, and thus serve not only to lock the wheel in position while weighing a certain or definite quantity of matter, but also prevent possible shifting to thus avoid any want of accuracy as to the weight presented to counterbalance the article or matter to be weighed to correspond to the particular raised weight of the wheel 40. While the beam 9, of the scale or balance is in an elevated position after the pin 37, has been brought into contact with a weight and raised in a pocket of the wheel 40, the dial-plate 50, can not be turned or shifted by the thumb-nut 51. On the top plate or lid 7, adjacent to the periphery of the dial-plate 50, is provided a point, line or zero mark, to designate a point of starting for the turning of the graduated dial-plate 50, therefrom so as to permit with such turning of a weight of the pocket-wheel 40, to be brought immediately beneath, within the case 6, into a position to be engaged by the head 38, of the pin 37, corresponding with the numeral represented on the dial-plate to the turned mark, point or line of the plate or lid 7. By arranging the weights so as to be concealed greater accuracy of matter to be weighed is insured, because all extraneous matter, as dust, grit or the like, is kept from the weighing and operating mechanism of the appliance and hence can not affect the weight of such matter.

To operate the described scale or balance from its normally lowered poised inoperative position with the plates 27 and 28, in the position shown in Fig. 1, the thumb-nut 34, is turned to operate the crank-arm 33, and to cause the pin $33^a$, to engage the offset $33^b$, of the bearing 35, as illustrated in Fig. 2, and at the same time, the end of the scale-beam 9, actuating the pin 37, will enter an opening $40^a$, of a pocket containing a weight $39^a$, Fig. 4, of the pocket-wheel 40, to raise the same therein, and with it at the same time the locking-pin 47, in an opening between two of the pockets of the series of the pocket-wheel 40, to hold the said wheel in a temporarily fixed position against possible shifting in any attempt at turning the dial-plate 50, by the thumb-nut 51, thereof; and at the same time with the scale-beam or balance 9, thus weighted, the plates 27 and 28, will be elevated one above the other and on the dial-plate will be indicated by the pointer opposite the mark, point or line, the weight which the end 38, of the pin 37, has elevated and thereby the amount of matter the opposite end of the scale-beam 9, will require, to cause the plates 27 and 28, to poise or aline with each other, to designate the quantitative amount of matter being weighed, as illustrated in Fig. 1.

Having thus described the nature and objects of my invention, what I claim as new and desire to secure by Letters Patent is:—

1. A prescription beam scale or balance, consisting of a wheel having weight carrying pockets, a scale-beam, means to raise and lower said beam and a pin adapted to be brought into operative relation with said beam to cause the said pin to engage a weight of said pocket-wheel, substantially as and for the purposes described.

2. A prescription beam scale or balance, consisting of a rotatable pocket-wheel for holding different denominational weights, a dial-plate, means to operatively connect said dial-plate with said pocket-wheel, a scale-beam, means to raise and lower said beam, and a pin adapted to be brought into operative relation with said beam to cause the said pin to engage a weight of said pocket-wheel, substantially as and for the purposes described.

3. A prescription scale or balance, consisting of a rotatable pocket-wheel carrying different weights, a dial-plate, means to operatively connect said dial-plate with said pocket-wheel, a scale-beam, means to raise and lower the same, a pin adapted to be brought into operative relation with said beam to engage a weight of said pocket-wheel, and means to lock said weight carrying pocket-wheel in a position corresponding to that indicated on the dial-plate, substantially as and for the purposes described.

4. A prescription scale or balance, consisting of a scale-beam, means to raise and lower said beam, a dial-plate, a weight carrying pocket-wheel, means to operatively connect said dial-plate with said wheel, means adapted to be brought into operative relation with said beam to engage a weight of said pocket-wheel and locking means to hold the said pocket-wheel in a position corresponding to that indicated on said dial-plate, substantially as and for the purposes described.

5. A prescription scale or balance, consisting of a casing, a scale-beam, means provided with a device, located outside of said casing, to raise and lower said beam, a dial-plate located outside of said casing, a rotatable weight carrying pocket-wheel mounted in said casing, means to operatively connect said dial-plate with said pocket-wheel, and means adapted to be brought into operative relation with said beam to engage a weight of the series of said pocket-wheel, coincidently with the raising of said beam, substantially as and for the purposes described.

6. A prescription balance or scale, consisting of a scale-beam, means to raise and lower said beam, a dial-plate, a weight carrying pocket-wheel, means to connect said pocket-wheel with said dial-plate, means adapted to be brought into operative relation with said beam to engage a weight of said pocket-wheel and means to lock said pocket-wheel against shifting of the same after raising said beam, substantially as and for the purposes described.

In witness whereof, I have hereunto set my signature in the presence of two subscribing witnesses.

WILLIAM W. DRYDEN.

Witnesses:
   J. WALTER DOUGLASS,
   THOMAS M. SMITH.